Dec. 25, 1956 J. O. ISRAEL 2,775,701

FREQUENCY CONTROLLED OSCILLATION SYSTEM

Filed March 19, 1954 3 Sheets-Sheet 1

INVENTOR
J. O. ISRAEL
BY
Franklin Mohr
ATTORNEY

Dec. 25, 1956 J. O. ISRAEL 2,775,701
FREQUENCY CONTROLLED OSCILLATION SYSTEM
Filed March 19, 1954 3 Sheets-Sheet 2

FIG. 2

| OSC. NO. 1 | |
|---|---|
| NOMINALLY 90 TO 70 MC. BY 1 MC. STEPS | |
| STEP NO. | MEASURED FREQ. |
| 0 | 90 MC. |
| 1 | 89 |
| 2 | 88 |
| 3 | 87 |
| 4 | 86 |
| 5 | 85 |
| 6 | 84 |
| — | — |
| 19 | 71 |
| 20 | 70 |

FIG. 3

| OSC. NO. 2 | |
|---|---|
| NOMINALLY 90 TO 90.9 MC. BY 100 KC. STEPS | |
| STEP NO. | MEASURED FREQ. |
| 0 | 90.0 MC. |
| 1 | 90.1 |
| 2 | 90.2 |
| 3 | 90.3 |
| 4 | 90.4 |
| 5 | 90.5 |
| 6 | 90.6 |
| 7 | 90.7 |
| 8 | 90.8 |
| 9 | 90.9 |

FIG. 4

| OSC. NO. 3 | |
|---|---|
| NOMINALLY 232 TO 322 KC. BY 10 KC. STEPS | |
| STEP NO. | MEASURED FREQ. |
| 0 | 232 KC. |
| 1 | 242 |
| 2 | 252 |
| 3 | 262 |
| 4 | 272 |
| 5 | 282 |
| 6 | 292 |
| 7 | 302 |
| 8 | 312 |
| 9 | 322 |

FIG. 5

| OSC. NO. 4 | |
|---|---|
| 32 TO 23 KC. BY 1 KC. STEPS | |
| STEP NO. | MEASURED FREQ. |
| 0 | 32 KC. |
| 1 | 31 |
| 2 | 30 |
| 3 | 29 |
| 4 | 28 |
| 5 | 27 |
| 6 | 26 |
| 7 | 25 |
| 8 | 24 |
| 9 | 23 |

FIG. 6

| OSC. NO. 5 | |
|---|---|
| 2 TO 3 KC. CONTINUOUSLY CALIBRATED | |
| MARKED FREQ. | MEASURED FREQ. |
| 0 C.P.S. | 2000 C.P.S. |
| 100 | 2100 |
| 200 | 2200 |
| 300 | 2300 |
| 400 | 2400 |
| 500 | 2500 |
| 600 | 2600 |
| 700 | 2700 |
| 800 | 2800 |
| 900 | 2900 |

FIG. 7

| STEP NO. | NOMINAL RANGE OF $f_1$ | | |
|---|---|---|---|
| 0 | 1232 | TO | 1323 KC. |
| 1 | 2232 | | 2323 |
| 2 | 3232 | | 3323 |
| 3 | 4232 | | 4323 |
| 4 | 5232 | | 5323 |
| 5 | 6232 | | 6323 |
| 6 | 7232 | | 7323 |
| 7 | 8232 | | 8323 |
| — | — | | — |
| 19 | 20232 | | 20323 |
| 20 | 21232 | | 21323 |

FIG. 8

| STEP NO. | NOMINAL RANGE OF $f_2$ | | |
|---|---|---|---|
| 0 | 1232 | TO | 1223 KC. |
| 1 | 1132 | | 1123 |
| 2 | 1032 | | 1023 |
| 3 | 932 | | 923 |
| 4 | 832 | | 823 |
| 5 | 732 | | 723 |
| 6 | 632 | | 623 |
| 7 | 532 | | 523 |
| 8 | 432 | | 423 |
| 9 | 332 | | 323 |

INVENTOR
J. O. ISRAEL
BY Franklin Mohr
ATTORNEY

INVENTOR
J. O. ISRAEL
BY
Franklin Mohr
ATTORNEY 2,775,701
Patented Dec. 25, 1956

2,775,701

FREQUENCY CONTROLLED OSCILLATION SYSTEM

John O. Israel, West Orange, N. J., assignor to Bell Telephone Laboratories, Incorporated, New York, N. Y., a corporation of New York Application March 19, 1954, Serial No. 417,449

4 Claims. (Cl. 250—36)

This invention relates to highly precise means and methods for setting up and maintaining a wave the frequency of which is automatically locked in with the frequencies of a plurality of standard reference sources.

An object of the invention is to set up any desired output frequency with such accuracy that the frequency shall depart from the desired value by an amount no greater than the sum of the maximum errors of a plurality of standard frequency sources, including the maximum error of an interpolation oscillator for obtaining frequencies between adjacent harmonics of the lowest frequency standard source.

Another object is to reduce the stringency of frequency discrimination requirements upon certain of the elements of such a system.

A further object is to insure that for every setting of the frequency determining dials of the system there shall be but one final output frequency possible and to insure that the final output frequency shall without fail correspond exactly with the desired frequency within the limits of error aforesaid.

A feature of the invention is an increase in the number of standard frequency sources and auxiliary oscillators employed compared with certain prior art systems, with the result that less precise calibrations are required for the auxiliary oscillators and the total cost of the frequency locking arrangements may be reduced accordingly, while the over-all accuracy of settings obtainable is preserved.

Another feature is the use of a band pass filter to eliminate ambiguity as to the ordinal number of the harmonic with which a given auxiliary oscillator is locked.

A further feature of the invention is the choice of a suitable set of offset frequencies for the respective auxiliary oscillators according to a scheme whereby the frequency offsets cancel out in the process of synthesizing the desired output frequency.

In the drawings:

Figs. 2 through 6 are tabular representations of the relationship of scale readings to measured frequencies in the several variable oscillators comprised in the system shown in Fig. 1;

Figs. 7 and 8 are tabular representations of the frequency ranges over which the waves vary, at certain points in the system shown in Fig. 1;

Figure 1:
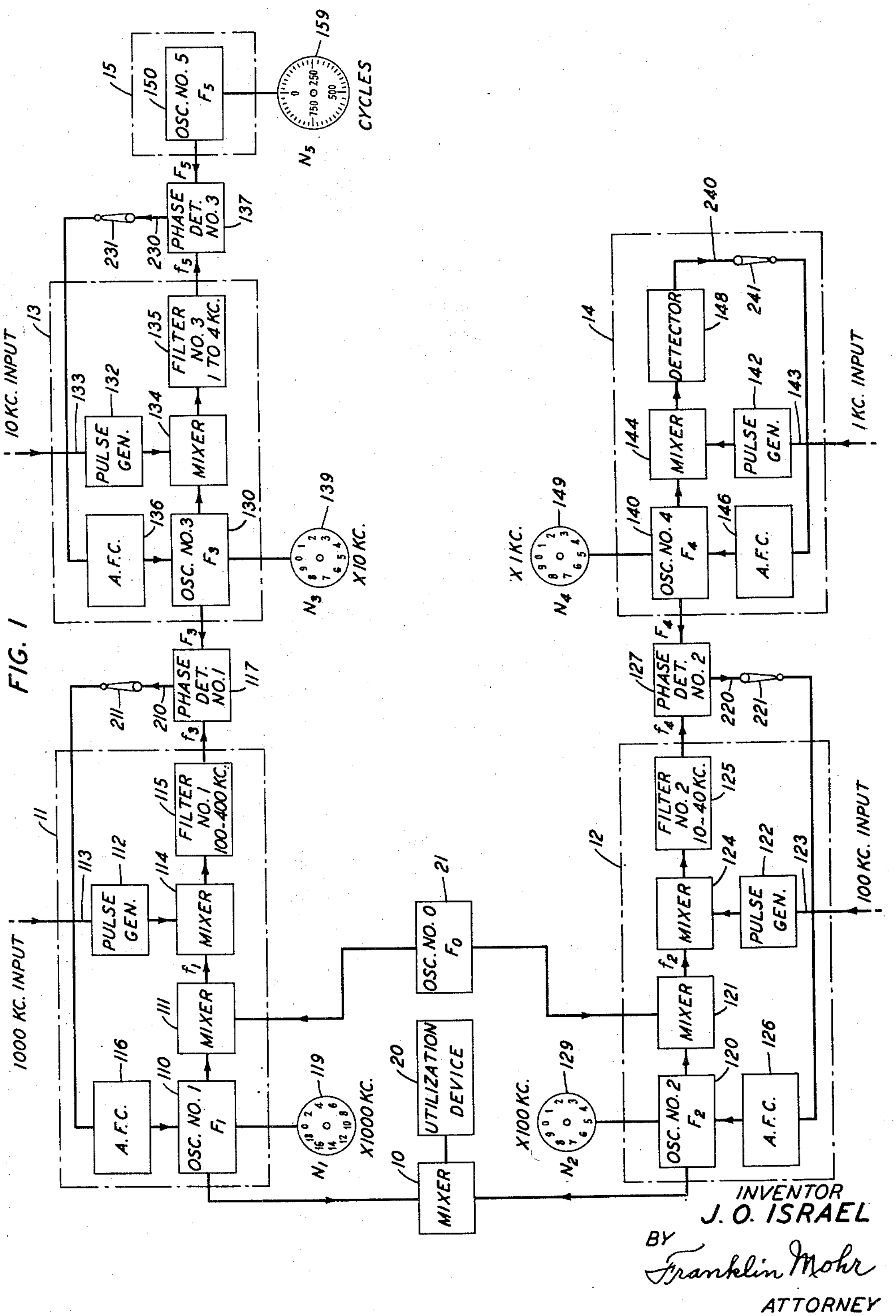
Fig. 1 is a block schematic diagram of an illustrative embodiment of the invention.

In the system of Fig. 1, two trains of major units are shown connected through a mixer 10 to any desired utilization device 20. The upper train as shown in the figure comprises three odd-numbered units 11, 13, and 15, although either more or fewer units may be employed as desired. The lower train in the figure comprises two even-numbered units 12 and 14, although again the number of units in the train may be varied as desired. The units are numbered in numerical order beginning with unit 11 in the upper train as disposed in the figure and continuing alternately with unit 12 in the lower train, unit 13 in the upper train, etc.

In both the upper train and the lower train each major unit except the last one at the right-hand end of each train as disposed in the figure is essentially an auxiliary oscillator which is automatically controlled as to frequency in conventional manner by means of a phase-sensitive detector under the control of a standard frequency source individual to the unit in question. The first unit at the left-hand end of each train as illustrated in the figure may be special and is so shown in the figure, the special feature being that the oscillator is of the heterodyne type comprising the combination of a mixer and two simple, i. e., nonheterodyne, oscillators, one of which is shown outside the unit. More specifically, units 11 and 12 are shown as each including an individual oscillator which may be nonheterodyne, the two units together employing a common beating oscillator 21. Unit 13 is a typical unit involving a single oscillator which may be nonheterodyne. Additional units essentially like unit 13 may be added as intermediate units in either the upper or the lower train in any desired number, or even substituted for heterodyne units 11 and 12. Units 14 and 15 are special terminal units. Either train may be terminated at the right-hand end either by a unit like unit 14 or by one like unit 15. Units like unit 14 may be used to terminate both trains if desired, whereas it will not usually be advantageous to use units like unit 15 to terminate both trains. Where a terminal unit of the type of unit 15 is used it will preferably be the unit with the largest ordinal number regardless of which train contains the unit with that ordinal number.

Assuming that it is desired that the system cover all frequencies from some lower limit such as 50 kilocycles or less, up to say 20 megacycles, the standard reference frequencies may conveniently constitute a decade or decimal system, namely 1, 10, 100, and 1000 kilocycles as shown in Fig. 1 together with an interpolation oscillator (Oscillator No. 5) covering a band of frequencies one kilocycle wide. Oscillators Nos. 0 and 1, and a mixer 111 form together a heterodyne source, covering a frequency band 20 megacycles wide with a suitable offset frequency of 1232 kilocycles, determined as hereinafter explained. Oscillator No. 1 may produce a band of frequencies 20 megacycles wide extending actually from say 90 megacycles to 70 megacycles. The dial 119 associated with Oscillator No. 1 may have a scale marked in steps nominally one megacycle each, step zero being at a measured frequency of 90 megacycles, step one at a measured frequency 89 megacycles, etc., down to step twenty at a measured frequency of 70 megacycles. Fig. 2 shows in tabular form such an allocation of the measured frequencies to the steps on dial 119.

Oscillator No. 0 is set to 90 megacycles plus the desired offset frequency, a total of 91,232 kilocycles. This oscillator is not adjusted during normal operation. The frequency $F_0$ which it supplies is used as a comparison frequency with which all other frequencies used in the system are compared. As only frequency differences are relied upon, the absolute value of $F_0$ need not be known with great precision nor need the frequency stability of Oscillator No. 0 be exceedingly great, nor is any automatic frequency control required therefor.

The frequency $f_1$ developed at the output of the mixer 111 is the difference between $F_0$ and $F_1$ and covers a range substantially 20 megacycles wide which is offset from zero frequency by the predetermined offset frequency, 1232 kilocycles.

It is advantageous to use two oscillators such as No. 0 and No. 1 and a mixer 111 to supply the frequency controlled wave rather than a single oscillator, in that the limits of the frequency range of the calibrated oscillator (Oscillator No. 1) may be placed in a favorable portion of the frequency spectrum in accordance with well known practice. A single oscillator tunable over a range from say 10,000 to 20,000,000 cycles per second is more difficult to build and to calibrate precisely than one, for example tunable from 70 megacycles to 90 megacycles per second. Use of the heterodyne principle also avoids appearance of spurious harmonics as a result of the automatic frequency control because harmonics of Oscillator No. 1 which may result from frequency control are well removed from the useful frequency band of that oscillator.

Referring now particularly to unit 11 in Fig. 1, Oscillator No. 1, further identified by reference numeral 110 has its output connected along with an output from Oscillator No. 0, to the input of the mixer 111 which may be of conventional design. A pulse generator 112, also of conventional design is arranged to be supplied with an input wave of standard reference frequency, e. g. 1000 kilocycles, through an input path 113. A second mixer 114 has its input circuits connected respectively to the output of the mixer 111 and the output of the pulse generator 112. The output wave from the mixer 114 is arranged to be passed through a band pass filter 115, designated Filter No. 1, to constitute one of two outputs from the unit 11. The second output from the unit 11 constitutes the output from the oscillator 110 to the mixer 10. The oscillator is provided with an automatic frequency control unit 116 of any suitable known type.

Unit 12 is similar to unit 11 but is supplied with an input of a standard frequency, e. g., 100 kilocycles, differing in frequency by one decade from the standard frequency input supplied to unit 11. The oscillator, designated Oscillator No. 2, is indicated by reference numeral 120, and has its output connected to the input of a mixer 121 along with a connection from the oscillator 21. The pulse generator 122 is supplied with a 100-kilocycle input wave over an input path 123. Output waves from the mixer 121 and the pulse generator 122 are combined in a mixer 124, the output from which in turn is supplied to a filter 125, designated Filter No. 2. An automatic frequency control unit 126 is provided to control the oscillator 120.

Unit 13 comprises an oscillator 130, designated Oscillator No. 3, connected to a mixer 134 together with a wave from a pulse generator 132. A wave of standard frequency, e. g., 10 kilocycles, is supplied to the input of the pulse generator 132 over an input path 133. The output of the mixer 134 is supplied to a filter 135, designated Filter No. 3. An automatic frequency control 136 is provided to control the oscillator 130.

Unit 14 comprises an oscillator 140, designated Oscillator No. 4, connected to a mixer 144 together with the output of a pulse generator 142, which latter is supplied with a standard frequency, e. g., one kilocycle, over an input path 143. An automatic frequency control unit 146 is provided to control the oscillator 140. The output of the mixer 144 is supplied to a detector 148, the output of which is supplied in turn to the control unit 146.

Unit 15 comprises an oscillator 150, designated Oscillator No. 5, which covers, for example, a frequency band one kilocycle in width and may be calibrated continuously to any desired fineness of scale division. Oscillator No. 5 functions as an interpolation oscillator, interpolating between frequency controlled cardinal points on the scale of Oscillator No. 4.

Between each pair of immediately adjacent units in each train there is provided a phase-sensitive detector to the input of which is supplied a wave from the filter of the unit on the left in the figure and a wave from the output of the oscillator of the unit on the right. The output of each phase detector is connected to the input of the automatic frequency control in the unit to the left through a control path which may include a switch. The phase-sensitive detectors 117, 127, and 137 are designated Phase Detectors No. 1, No. 2, and No. 3 respectively. Each may be of any suitable type, such as a phase-sensitive rectifier disclosed in the book entitled "Principles of Radar" by members of the staff of the Radar School, Massachusetts Institute of Technology, third edition, McGraw-Hill Book Company, 1952, pages 314–315 and Fig. 35, or United States Patent No. 2,288,025, issued June 30, 1942, to A. F. Pomeroy. The respective control paths are designated 210, 220, and 230, with individual switches 211, 221, and 231.

Each oscillator is provided with a manual setting means such as a dial having an index and a calibrated scale, except that Oscillator No. 0 need not be so provided as it operates at a single, fixed frequency. The dials for Oscillators Nos. 1, 2, 3, 4, and 5 are designated 119, 129, 139, 149, and 159, respectively. The scales of Oscillators Nos. 2, 3, and 4 are preferably provided with ten equal scale divisions numbered from 0 to 9, inclusive, conforming to a decimal system. The scale of Oscillator No. 1 may also have ten scale divisions, or it may have any other desired number, e. g., twenty divisions. To avoid crowding in the drawing only the even numbered divisions of a 20-division scale are shown on dial 119. The scale of Oscillator No. 5 is preferably finely divided and may have a continuous scale covering a range from 0 to 1000.

In mixer 114, the substantially single-frequency wave of frequency $f_1$ from mixer 111 beats with pulses of 1000 kilocycle repetition rate from pulse generator 112, producing a plurality of beat frequencies, a single one of which is selected in Filter No. 1. Provided the frequency $f_1$ differs from the nearest harmonic of 1000 kilocycles by an amount in the range from 100 kilocycles to 400 kilocycles there will be a wave passing through Filter No. 1 at the difference frequency. The designation $f_3$ is assigned to represent the frequency of such a wave and is indicated in the drawing at the filter output.

Amplification may be employed, if needed, preferably following each filter, to bring the amplitude of the wave from the preceding mixer to a suitable value for application to the next following phase-sensitive detector.

Oscillator No. 3 provides a plurality of frequency steps at intervals of ten killocycles each, which lie within the pass band of Filter No. 1. Step 0 on dial 139 of Oscillator No. 3 corresponds to a measured frequency of 232 kilocycles, step 1, 242 kilocycles, etc., up to step 9 at 322 kilocycles. The correlation between these steps and the measured frequency of Oscillator No. 3 is shown in tabular form in Fig. 4.

Phase Detector No. 1 compares the phase of the substantially single frequency sinusoidal wave of frequency $f_3$ from Filter No. 1 with the phase of a substantially single frequency sinusoidal wave of comparable frequency $F_3$ from Oscillator No. 3. The automatic frequency control action establishes a frequency difference between $f_1$ and the next lower harmonic of 1000 kilocycles of such value that $f_3$ becomes equal to $F_3$. Any departure from a predetermined standard phase relationship between these two sinusoidal waves results in the production of a control wave which is applied to the automatic frequency control 116 to change the frequency $F_1$ in the proper sense to establish or restore the said predetermined standard phase relationship.

In the mixer 114, the wave of frequency $f_1$ beats with harmonics of the 1000 kilocycle reference frequency from the pulse generator 112, to produce a plurality of beat frequencies one and only one of which lies within the pass band of Filter No. 1. The action of Phase Detector No. 1 wherein the selected beat frequency wave is compared in phase with the wave of frequency $F_3$ from Oscillator No. 3 energizes the automatic frequency control 116 which in turn acts to lock Oscillator No. 1 at a point below the frequency $F_0$ of Oscillator No. 0 by a suitable frequency interval.

A generally similar operation centers about the Phase Detector No. 3 wherein the phase of a wave of frequency $f_5$ from Filter No. 3 is compared with the phase of a wave of frequency $F_5$ from Oscillator No. 5 to actuate the automatic frequency control 136 to readjust Oscillator No. 3 until $f_5$ becomes equal to $F_5$.

Oscillator No. 5, which is the interpolation oscillator, has an offset of two kilocycles and the frequency range covered is from two to three kilocycles. The scale on its dial 159 is marked with 0 at a measured frequency of 2000 cycles and marked as 1000 cycles at a measured frequency of 3000 cycles. Fig. 6 shows in tabular form the relationship between a few of the dial settings of the interpolation oscillator and the corresponding measured frequencies.

In unit 13, the frequency $F_3$ from Oscillator No. 3, beats with a plurality of harmonics of 10 kilocycles from pulse generator 132 to produce a plurality of beat frequencies, one and only one of which passes through Filter No. 3 and beats with the wave of frequency $F_5$ from Oscillator No. 5 in Phase Detector No. 3, thereby actuating the automatic frequency control 136 to change the frequency $F_3$ by a suitable amount. When this adjustment is completed, $F_3$ continues to beat with harmonics of 10 kilocycles in mixer 134 to produce a wave of frequency $f_5$, which now is equal in frequency to $F_5$.

The change in $F_3$ upsets the phase balance in Phase Detector No. 1, requiring a further downward adjustment of $F_1$ by control 116.

The correlation of dial steps with measured frequencies of Oscillator No. 2 is shown in tabular form in Fig. 3. A similar correlation of dial steps with measured frequencies of Oscillator No. 4 is shown in tabular form in Fig. 5.

In unit 12, frequency $F_2$ beats with $F_0$ to produce $f_2$. This beats with a plurality of harmonics of the 100 kilocycle reference source to produce a plurality of beat frequencies, one and only one of which, $f_4$, lies in the pass band of Filter No. 2. In Phase Detector No. 2, the wave of frequency $f_4$, combines with the wave of frequency $F_4$, to actuate control 126 to raise the frequency $F_2$ by a suitable amount.

Unit 14 maintains the frequency $F_4$ in synchronism with a harmonic of one kilocycle. This control is effected by beating the output wave from Oscillator No. 4 in mixer 144 with pulses of one kilocycle repetition frequency from the pulse generator 142 to produce a control wave which energizes detector 148 to actuate automatic frequency control 146 through a control path 240 which may include a switch 241.

The final useful output frequency is obtained in mixer 10 by beating $F_1$ with $F_2$. It will be found at this point that all the offset frequencies have cancelled out in the process of synthesizing the desired final output frequency, as will be explained hereinafter.

It will be evident that $f_1$ and $f_2$ both vary during normal operation of the system of Fig. 1, $f_1$ having a range 91 kilocycles wide and $f_2$ having a range nine kilocycles wide, according to the illustrative frequency allocation recited. The frequency limits of the range of $f_1$ depend upon the step selected on dial 119 and are listed in tabular form in Fig. 7. The frequency limits of the range of $f_2$ depend upon the step selected on dial 129 and are listed in tabular form in Fig. 8. The range of $f_1$ is necessitated by the dependence of the frequency $F_1$ upon the settings of Oscillators Nos. 3 and 5, that is, in general, all oscillators to the right of Oscillator No. 1 in Fig. 1, in the present example a maximum of 90 kilocycles variation of Oscillator No. 3, plus a maximum of one kilocycle variation of Oscillator No. 5. Similarly, the range of $f_2$ is necessitated by the dependence of $F_2$ upon the setting of Oscillator No. 4, that is, in general, all oscillators to the right of Oscillator No. 2 in Fig. 1, a maximum of nine kilocycles variation.

Considering unit 14 in more detail, Oscillator No. 4 is locked in to the standard frequency source of one kilocycle base frequency by any suitable means such as the mixer 144, the detector 148, and the automatic frequency control unit 146. In the mixer 144, pulses of repetition frequency one kilocycle are combined with a sinusoidal wave from the output of Oscillator No. 4 to produce in the output of the mixer new pulses which are of constant amplitude as long as the original pulses occur in fixed phase relationship to the sinusoidal wave. If any change in relative phase occurs the amplitude of the new pulses varies, the variations being detected by the detector 148 and applied as a control to actuate the automatic frequency control.

Figure 9:
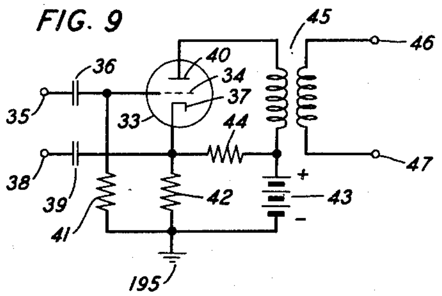
Fig. 9 is a schematic circuit diagram of a mixer suitable for use in one of the units of the system shown in Fig. 1.

Various mixing circuits suitable for mixer 144 are known in the art, one being selected for illustration in detail in Fig. 9 comprising a triode tube 33 with one input applied to the control grid 34 between ground 195 and an input terminal 35 through a coupling condenser 36. The other input is applied to the cathode 37 between ground 195 and an input terminal 38 through a coupling condenser 39. A grid leak 41, a cathode load resistor 42, and an anode potential supply source 43 are provided in conventional manner. A cathode bias is provided through a grid bias regulating resistor 44 as shown. An output transformer 45 is connected with its primary winding between the anode 40 and the positive terminal of the anode potential supply source 43. The secondary winding of the transformer 45 is connected to a pair of output terminals 46 and 47.

Figure 10:
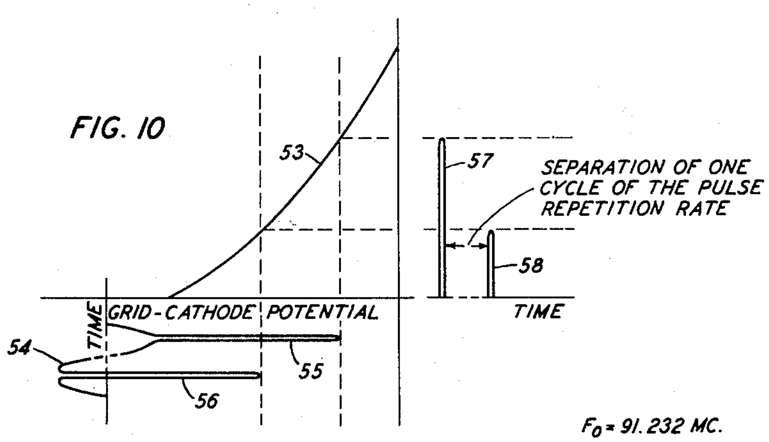
Fig. 10 is a diagram useful in explaining the operation of the mixer shown in Fig. 9.

Fig. 10 helps to explain a preferred method of operating the mixer of Fig. 9 whereby the sinusoidal input wave is suppressed in the output. The curve 53 illustrates the anode current vs. grid-cathode potential characteristic of the tube 33. It is assumed that by means of proper proportioning of the resistors 42 and 44 in Fig. 9 the grid-cathode circuit is biased beyond cut-off, and sufficiently so that the impressed sinusoidal wave, represented by curve 54, produces no anode current in the absence of pulses. The pulses, when applied, are superimposed upon the signal current and may occur in general at any phase of the signal wave, as for example as shown at 55 and 56, respectively, the former being shown arising from a positive peak and the latter from a negative peak of the signal wave. The resulting anode current comprises pulses 57 and 58, respectively, which are essentially free from any component of the signal wave 54. In actual practice, the pulses 55, 56 are spaced apart at time intervals equal to full cycles of the standard frequency, one kilocycle in the case of unit 14. Whether a given pulse is superimposed upon a positive peak, a negative peak, or upon some other portion of the signal wave depends upon the phase relationship between the pulse train and the signal wave. While pulses 55 and 56 are shown adjacent in Fig. 10, for economy of space, in practice the succeeding pulses will be spaced apart by one or more, up to 32 cycles of the signal wave in the illustrative embodiment shown in Fig. 1, broken lines being used in the figure to indicate an interval or intervals between pulses. The output pulses will always occur with the repetition rate of the standard frequency, here one kilocycle, whatever the frequency of the sinusoidal wave.

While the particular form of mixer shown in Fig. 9 operated as shown in Fig. 10 illustrates very clearly the independence of the mixer output wave with respect to the particular harmonic which is closest to the frequency of the signal wave, it may also be shown that a control wave having such independence is present as a component part of the output wave from other sorts of mixers and by other methods of mixer operation. In any form of mixing device in which modulation occurs, such a control wave is present and may be selected and utilized.

The output wave of the mixer 144 is applied with or without accompanying amplification to detector 148 where it is converted into a control wave for the automatic frequency control unit 146. The control wave should be phase-sensitive, depending usually upon the value of cos $\theta$, where $\theta$ is the phase difference.

It can be shown that stable frequency locking is obtainable over a certain range of values of phase difference $\theta$ while instability occurs over the remaining range. Assume first that a locked in condition exists with a phase difference of 90 degrees. Suppose then that the oscillator being controlled lowers its frequency slightly. This causes the phase difference $\theta$ to increase, giving cos $\theta$ a negative value and decreasing the height of the resultant pulses. If the connections of the automatic frequency control are such that decreasing the pulse height causes the automatic frequency control to lower the oscillator frequency still further, the system is evidently unstable. On the other hand, if decreasing the pulse height results in raising the oscillator frequency, stable operation is had. Assuming next that a locked in condition exists with $\theta$ equal to 270 degrees, then a lowering of the oscillator frequency causes cos $\theta$ to take on a positive value, increasing the pulse height. Stable operation at this value of $\theta$ is had if increasing the pulse height raises the oscillator frequency. Depending upon the internal arrangements of the automatic frequency control, stable operation will occur in the range of value of $\theta$ either from 0 to 180 degrees or from 180 degrees to 360 degrees, but not both. When $\theta$ reaches zero or 180 degrees, synchronism is lost momentarily and the system jumps abruptly to the next adjacent harmonic.

Figure 11:
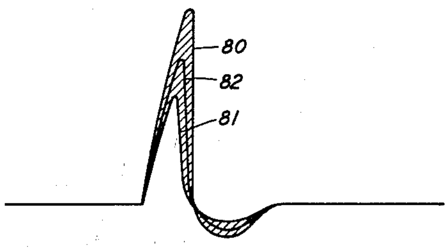
Fig. 11 is a sketch of pulse forms produced in the mixer shown in Fig. 1.

Since cos $\theta$ can range in value between plus one and minus one, the new pulse can range between a maximum positive value and a maximum negative value. However, the new pulse is superimposed upon the orginal pulse which may be larger than the new pulse in which case the two are directly in phase with each other and generally similar in shape. Hence, the resultant pulse varies in height as illustrated in Fig. 11 between two positive values as long as frequency locking has not been accomplished. Curve 80 represents the pulse of maximum height and curve 81 the pulse of minimum height. The pulse varies in height at a rate equal to the frequency difference between the sinusoidal wave and the nearest harmonic component of the pulse. In an oscilloscope a solid pattern appears between curves 80 and 81 as indicated by cross hatching in Fig. 11. When frequency locking occurs the pulse height ceases to vary but assumes a value dependent upon cos $\theta$, which in turn depends upon the phase difference between the locked components. Curve 82 of Fig. 11 illustrates the pulse when locking has occurred. The wave forms of Fig. 11 are representative of the output of the mixer of Fig. 9 as well as of mixers in general.

The operation of the system of Fig. 9 is the same regardless of which harmonic the sinusoidal wave most nearly approaches in frequency.

The operation of the system shown in Fig. 1 may be explained in more general terms by reference to the following analysis.

Let $N_1$, $N_2$, $N_3$, $N_4$, and $N_5$ be scale readings which are indicated on the dials of the respective units.

Let $F_{10}$, $F_{20}$, $F_{30}$, $F_{40}$, and $F_{50}$ be the frequencies produced by the respective Oscillators Nos. 1, 2, 3, 4, and 5 when their dials are set to scale readings $N_1$, $N_2$, $N_3$, $N_4$, and $N_5$, respectively, assuming for the time being that the automatic frequency controls are ineffective to change the frequencies produced.

Also, let $f_{10}$ and $f_{20}$ be the frequencies appearing at the outputs of mixers 111 and 121, respectively, when Oscillators No. 1 and No. 2 produce $F_{10}$ and $F_{20}$, respectively.

The analysis that follows is applicable whether $f_{10}$ and $f_{20}$ are produced by heterodyning as in the system of Fig. 1, or by single oscillators without heterodyning. In either case, the scale readings $N_1$ and $N_2$ are to be understood as referring to the dials by means of which $f_{10}$ and $f_{20}$ may be varied.

It is desired to synthesize a final output frequency $F_D$ in such a manner that $$F_D = N_1 + N_2 + N_3 + N_4 + N_5 \qquad (1)$$

To obtain the final output frequency of 19,689,126 cycles per second for example, it is desired merely to set the dials to the following scale readings:

$$\begin{aligned} N_1 &= 19{,}000{,}000 \\ N_2 &= 600{,}000 \\ N_3 &= 80{,}000 \\ N_4 &= 9{,}000 \\ N_5 &= 126 \end{aligned} \qquad (2)$$

in cycles per second, in terms of readings of dials 119, 129, 139, 149, and 159, respectively.

The maximum error by which the final output frequency departs from its value as indicated by the scale readings is evidently no greater than the sum of the maximum errors of the standard frequency sources supplying the respective units plus the maximum error of the calibration of the interpolation oscillator, since when the frequency control operates each unit but the last has its frequency locked in to a harmonic of a standard frequency source.

Figure 12:
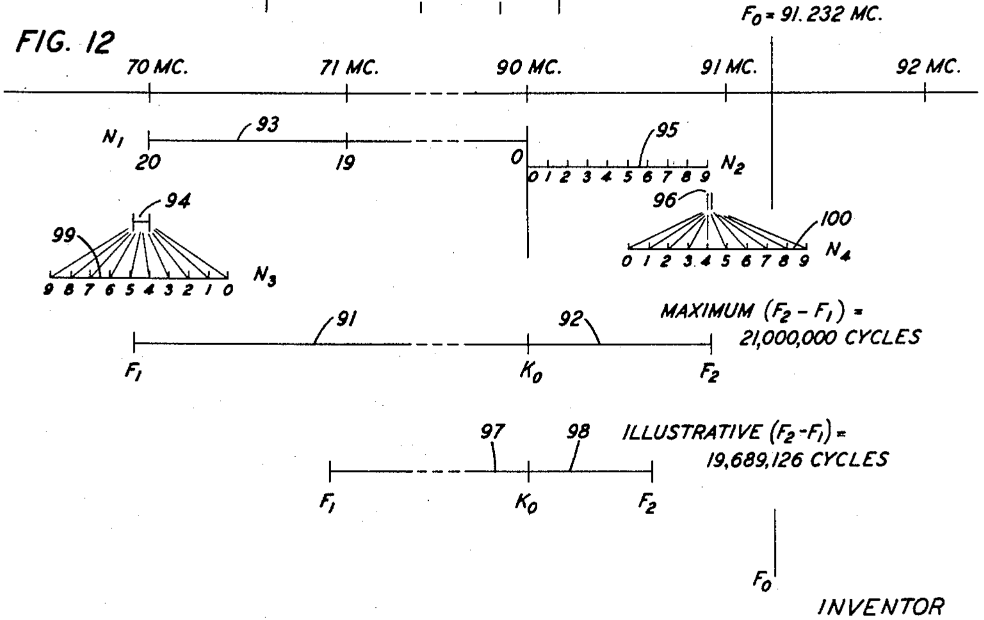
Fig. 12 is a graphical representation of certain frequencies occurring in the system shown in Fig. 1.

Fig. 12 shows graphically how, in accordance with the invention the frequency increments making up $F_1$ and $F_2$ are arranged on both sides of an arbitrarily chosen offset frequency $K_0$ illustrated as 90 megacycles. Line segment 91 extending from $K_0$ down to $F_1$ represents the minimum value of $F_1$, that is, for the case of the highest $F_D$ provided, namely 21 megacycles in the example illustrated.

Line segment 92 extending from $K_0$ up to $F_2$ represents the maximum value of $F_2$, that is, when $F_D$ is 21 megacycles.

Segment 91 is made up of three parts, of which the two longer parts are depicted in the upper portion of Fig. 12 by segments 93 and 94, and the third part is too short to be represented on the same scale and for clarity is omitted. Segment 93 is 20 megacycles in extent, from 90 megacycles down to 70 megacycles. Segment 94 is 90 kilocycles in extent, from 70,000 kilocycles down to 69,910 kilocycles. The third part (not shown) is one kilocycle in extent, from 69,910 kilocycles down to 69,909 kilocycles.

Segment 92 is made up to two parts 95 and 96, of which part 95 is 900 kilocycles in extent, from 90,000 kilocycles up to 90,900 kilocycles, and part 96 is nine kilocycles in extent, from 90,900 kilocycles up to 90,909 kilocycles.

The difference between $F_2$ and $F_1$ is $$90{,}909 - 69{,}909 = 21{,}000 \text{ kilocycles} \qquad (3)$$

As an example of a desired frequency less than 21,000 kilocycles, the illustrative example of 19,689,126 cycles is shown in graphic form by line segments 97 and 98.

Segment 97 extends from 90,000,000 cycles down to 70,919,874 cycles made up of three parts, the first extending from 90,000,000 cycles down to 71,000,000 cycles, contributing 19,000,000 cycles; the second from 71,000,000 cycles down to 70,920,000 cycles, contributing 80,000 cycles; and the third from 70,920,000 cycles down to 70,919,874 cycles, contributing 126 cycles; making a total of 19,080,126 cycles.

Segment 98 extends from 90,000,000 cycles up to 90,609,000 cycles, made up of two parts, the first extending from 90,000,000 cycles up to 90,600,000 cycles, contributing 600,000 cycles, and the second extending from 90,600,000 cycles up to 90,609,000 cycles, contributing 9,000 cycles; making a total of 609,000 cycles.

The difference between $F_2$ and $F_1$ in this example is $$90{,}609{,}000-70{,}919{,}874=19{,}689{,}126 \text{ cycles} \quad (4)$$

Because of space considerations the segments 91, 93, and 97 in Fig. 12 are shown broken away between 71 megacycles and 90 megacycles, it being impractical to show magnitudes differing so widely as 20,000 kilocycles and one kilocycle.

Steps of one megacycle each are marked along segment 93, corresponding to values of $N_1$. Because of the break in segment 93, only marks 0, 19, and 20 appear. Steps of 100 kilocycles each, corresponding to values of $N_2$ are marked to scale along segment 95. Steps of 10 kilocycles each along segment 94 and corresponding to values of $N_3$ are indicated diagrammatically by an expanded scale 99 which in actuality should be compressed within the length of segment 94, which is too short to accommodate such a scale. Steps of one kilocycle each corresponding to values of $N_4$ are indicated by an expanded scale 100 which should be compressed within the length of segment 96. Values of $N_5$ add on beyond segment 94 toward the left but are relatively so small that no attempt is made to indicate them in the figure.

In order that the ranges of variation of the respective variable oscillators may be located in favorable portions of the available frequency spectrum and in order that desired final output frequencies down to very low frequencies or even zero frequency may be obtained, each source is given a suitable frequency offset.

Let the offsets employed with the frequencies $f_{10}$, $f_{20}$, $F_{30}$, $F_{40}$, and $F_{50}$, respectively, be designated according to the following scheme:

$$\begin{aligned}&K_5+K_4+K_3+K_2\\&K_5+K_4+K_3+K_2\\&K_5+K_4+K_3\\&K_5+K_4, \text{ and}\\&K_5\end{aligned} \quad (5)$$

In what follows it will appear that the respective offsets are necessarily cumulative from unit to unit, as indicated by the compound expressions exhibited in the scheme of offsets. That is, the offset for the source of $F_{40}$ is the offset for the source of $F_{50}$ plus a further offset $K_4$; the offset for the source $F_{30}$ is the offset for the source $F_{40}$ plus a further offset $K_3$; and the offset for the source of $f_{20}$ is the offset for the source $F_{30}$ plus a further offset $K_2$. The scheme of synthesis requires that the offset for the source of $f_{10}$ is the same as the offset for the source of $f_{20}$.

Of the frequencies $f_{10}$, $f_{20}$, $F_{30}$, $F_{40}$, and $F_{50}$, each equals its frequency offset plus or minus the frequency as read from the scale on the dial by which the frequency can be varied. In accordance with the invention, the scale readings are applied alternately plus and minus the successive units of the train, a suitable arrangement being consistent with that illustrated in Fig. 12, and expressible as follows:

$$\begin{aligned}f_{10}&=K_5+K_4+K_3+K_2+N_1\\f_{20}&=K_5+K_4+K_3+K_2-N_2\\F_{30}&=K_5+K_4+K_3+N_3\\F_{40}&=K_5+K_4-N_4\\F_{50}&=K_5+N_5\end{aligned} \quad (6)$$

The automatic frequency controls produce frequency increments comprising departures from the frequencies set up by manipulation of the dials of the respective units. The notations $f_1$, $f_2$, $F_3$, $F_4$, $F_5$, as well as $F_1$ and $F_2$, will be assigned to represent the frequency of the respective source after the automatic frequency controls have produced the necessary frequency increments.

It is desired that the automatic frequency controls operate to supply such increments for the respective frequencies $f_{10}$, $f_{20}$, and $F_{30}$ as are necessary to synthesize a correct set of frequency components for the desired final output frequency. The last two units in the illustrative embodiment do not vary in frequency in the course of the synthesis. From what follows it will appear that a suitable set of values for the respective frequencies after the frequency control has been completed is $$\begin{aligned}f_1&=K_5+K_4+K_3+K_2+N_1+N_3+N_5\\f_2&=K_5+K_4+K_3+K_2-N_2-N_4\\F_3&=K_5+K_4+K_3+N_3+N_5\\F_4&=K_5+K_4-N_4=F_{40}\\F_5&=K_5+N_5=F_{50}\end{aligned} \quad (7)$$

again consistent with the arrangements shown in Fig. 12.

The desired final output frequency is obtainable as $$f_1-f_2=N_1+N_2+N_3+N_4+N_5$$

which will be recognized as the sum of the dial readings, all the offset frequencies having been cancelled out. In case heterodyning is used to produce $f_1$ and $f_2$, the desired final output frequency is also obtainable as $F_1-F_2$. It will be evident that $$F_1-F_2=f_1-f_2 \quad (8)$$

where the same local oscillator frequency $F_0$ is employed in heterodyning $F_1$ to $f_1$ as in heterodyning $F_2$ to $f_2$. Fig. 12 brings out the relationships between $F_1$, $F_2$, and $F_0$ in graphic manner.

The operation of the automatic frequency controls in effecting the synthesis of the desired output frequency will now be described in greater detail than hereinbefore, after a general discussion of the means by which the respective controls are energized.

In each of the units 11, 12, and 13, a wave of nominal frequency $f_{10}$, $f_{20}$, $F_{30}$, respectively, beats in a mixer with harmonics of the standard frequency supplied to the respective units through a pulse generator. In each unit, a plurality of beat frequencies result, and in each unit, a single one of the beat frequencies is selected by the respective Filter No. 1, No. 2, or No. 3. The selected beat frequencies have been designated $f_3$, $f_4$, and $f_5$, respectively.

The automatic frequency controls of the respective units 11, 12, and 13 are actuated by the outputs of Phase Detectors Nos. 1, 2, and 3, as hereinbefore noted. Each of these phase detectors is located between two units and compares phases of a beat frequency from the preceding unit and the oscillator frequency from the succeeding unit.

Starting with the action of Phase Detector No. 3, Oscillator No. 3 is controlled by automatic frequency control 136 to adjust $F_3$ away from the manually set value $F_{30}$ until as a result of the adjustment the frequency $f_5$ passed by Filter No. 3 is made equal to $F_5$. The frequency $f_5$ results from beating $F_3$ with a harmonic $H_{10}$ of the base frequency 10 kilocycles comprised in the output of the pulse generator 132. The beat frequency may be expressed as $$\begin{aligned}F_3-H_{10}&=K_5+K_4+K_3+N_3+N_5-H_{10}\\&=(K_5+N_5)+(K_4+K_3+N_3)-H_{10}\\&=F_5+(K_4+K_3+N_3)-H_{10}\end{aligned} \quad (9)$$

In order that the beat frequency may be $F_5$, it is necessary that $$K_4+K_3+N_3=H_{10} \quad (10)$$

As $H_{10}$ and $N_3$ are each harmonics of 10 kilocycles, $K_4+K_3$ must be a harmonic of 10 kilocycles.

Through the action of Phase Detector No. 1, Oscillator No. 1 is controlled by automatic frequency control 116 to adjust $f_1$ away from the initially set value $f_{10}$ until as a result of the adjustment the frequency $f_3$ passed by Filter No. 1 is made equal to $F_3$. The frequency $f_3$ results from beating $f_1$ with a harmonic $H_{1000}$ of the base frequency 1000 kilocycles comprised in the output of the pulse generator 112. The beat frequency may be expressed as $$f_1-H_{1000}=K_5+K_4+K_3+K_2+N_1+N_3+N_5-H_{1000}$$
$$=(K_5+K_4+K_3+N_3+N_5)+(K_2+N_1)-H_{1000}$$
$$=F_3+(K_2+N_1)-H_{1000} \quad (11)$$

In order that the beat frequency may be $F_3$, it is necessary that $$K_2+N_1=H_{1000} \quad (12)$$

or in other words, if $N_1$ is a harmonic of 1000 kilocycles, $K_2$ also must be a harmonic of 1000 kilocycles.

Through the action of Phase Detector No. 2, Oscillator No. 2 is controlled by automatic frequency control 126 to adjust $f_2$ away from the initially set value $f_{20}$ until as a result of the adjustment the frequency $f_4$ passed by Filter No. 2 is made equal to $F_4$. The frequency $f_4$ results from beating $f_2$ with a harmonic $H_{100}$ of the base frequency 100 kilocycles comprised in the output of the pulse generator 122.

The beat frequency may be expressed as $$f_2-H_{100}=K_5+K_4+K_3+K_2-N_4-N_2-H_{100}$$
$$=(K_5+K_4-N_4)+K_3+K_2-N_2)-H_{100} \quad (13)$$
$$=F_4+(K_3+K_2-N_2)-H_{100}$$

In order that the beat frequency may be $F_4$ it is necessary that $$K_3+K_2-N_2=H_{100} \quad (14)$$

or in other words, if $N_2$ is a harmonic of 100 kilocycles, $(K_3+K_2)$ also must be a harmonic of 100 kilocycles. Since $K_2$ must be a harmonic of 1000 kilocycles and hence of 100 kilocycles, $K_3$ also must be a harmonic of 100 kilocycles.

Since $K_3$ must be a harmonic of 100 kilocycles and hence a harmonic of 10 kilocycles, $K_4$ also must be a harmonic of 10 kilocycles.

Oscillator No. 4 is not controlled as to frequency by any unit other than unit 14 of which the oscillator is a part. The oscillator is controlled, however, by automatic frequency control 146 to synchronize $F_4$ with a harmonic $H_1$ of one kilocycle comprised in the output of the pulse generator 142. The beat frequency may be expressed as $$F_4-H_1=K_5+K_4-N_4-H_1 \quad (15)$$

In order to obtain a zero beat, it is necessary that $$K_5+K_4-N_4=H_1 \quad (16)$$

or in other words, if $N_4$ is a harmonic of one kilocycle, $(K_5+K_4)$ also must be a harmonic of one kilocycle. Since $K_4$ is a harmonic of 10 kilocycles and hence of one kilocycle, $K_5$ also must be a harmonic of one kilocycle.

Recapitulating the results of investigating the beat frequencies, it is found that in the illustrative embodiment of Fig. 1, $K_5$ is required to be a harmonic of one kilocycle; $K_4$ a harmonic of 10 kilocycles; $K_3$ a harmonic of 100 kilocycles; and $K_2$ a harmonic of 1000 kilocycles.

As noted above, the filter in a typical unit is employed to select from a plurality of beat frequencies one single beat frequency. By providing the filter with a single pass band of less than half the base frequency F supplied to the unit, the filter will pass only the beat frequency resulting from the impressed wave beating with the nearest harmonic of the standard frequency.

The filters may, for example, pass the band from 0.1F to 0.4F of the respective unit. It is evident that a beat frequency between an impressed wave and the second nearest harmonic will lie in the range from 0.5F to 1.0F, and hence lies outside the pass band.

By limiting the input frequencies applied to the mixer to those closer to the next higher harmonic or to those closer to the next lower harmonic as the particular case may require, it is feasible to insure that the beat frequency is produced only by the action of the one harmonic or the other, thereby preventing the alternative harmonic from introducing ambiguity.

Such limitation of input frequency range is effected by suitable choice of offsets.

In the embodiment illustrated the filter pass bands used are 100 to 400 kilocycles for Filter No. 1; 10 to 40 kilocycles for Filter No. 2; and 1 to 4 kilocycles for Filter No. 3.

We are now in a position to select particular offset frequencies which will cancel out and will center or approximately center the beat frequencies $f_3$, $f_4$, and $f_5$ within the pass bands of Filters No. 1, No. 2, and No. 3, respectively. Starting with $f_5$, it will be noted that normally $f_5$ equals $F_5$. The center of the pass band of Filter No. 3 is 2.5 kilocycles. When $N_5$ is varied, $F_5$ varies over a range one kilocycle wide. Hence to be centered in the band, $F_5$ variation should run from two to three kilocycles. Since $$F_5=K_5+N_5 \quad (17)$$

and $K_5$ has been found to be limited to harmonics of one kilocycle, $K_5$ should be chosen as two kilocycles. In other words, two kilocycles is the preferred offset for Oscillator No. 5.

Turning now to $f_4$ which normally equals $F_4$, the range of variation should be approximately centered in the pass band of Filter No. 2, which band centers about 25 kilocycles. We have $$F_4=K_5+K_4-N_4 \quad (18)$$

and $N_4$ varies over a range nine kilocycles wide. Hence, it would be desirable to assign to $F_4$ the range 20.5 to 29.5 kilocycles, giving Oscillator No. 4 an offset of 29.5 kilocycles. However, the choice of the offset is limited to values of $(K_5+K_4)$ and $K_5$ has already been assigned the value two kilocycles. Furthermore, $K_4$ has been shown to be limited to harmonics of 10 kilocycles. Hence, the best choice of offset that remains is 2+30 or 32 kilocycles offset for Oscillator No. 4. Accordingly, $F_4$ varies from 32 to 23 kilocycles.

We next consider $$F_3=K_5+K_4+K_3+N_3+N_5 \quad (19)$$

$N_5$ varies over a range one kilocycle wide and $N_3$ over a range 90 kilocycles wide. Hence, $F_3$ varies over a range 91 kilocycles wide. The center of the pass band of Filter No. 1 lies at 250 kilocycles. The most central range for $F_3$ is thus from 204.5 to 295.5 kilocycles, suggesting an optimum offset of 204.5 kilocycles. However, $(K_5+K_4)$ has already been set at 32 kilocycles and $K_3$ has been shown to be limited to harmonics of 100 kilocycles. Hence, the best remaining choice of offset is 2+30+200 or 232 kilocycles offset for Oscillator No. 3. Accordingly, $F_3$ varies between 232 and 323 kilocycles.

The sources of the frequencies $f_1$ and $f_2$ are advantageously given offsets, although not because of filter pass band limits. Since $$f_2=K_5+K_4+K_3+K_2-N_2-N_4 \quad (20)$$

$f_2$ varies on account of $N_2$ over a range 900 kilocycles wide, and over a range nine kilocycles wide due to $N_4$. The total range of variation of $f_2$ is therefore 909 kilocycles. The source of $f_2$ must have enough frequency offset so that $f_2$ can vary downward by 909 kilocycles without reaching zero. Since $(K_5+K_4+K_3)$ is 232 kilocycles and $K_2$ is limited to harmonics of 1000 kilocycles (which could include zero), the lowest permissible value of $K_2$ is evidently 1000 kilocycles, making the frequency offset for $f_2$ total 1232 kilocycles. Accordingly, $f_2$ varies from 1232 kilocycles to 323 kilocycles.

The source of frequency $f_1$ requires an offset exactly equal to that of $f_2$ in order that $(f_1-f_2)$ shall give the desired final output frequency and all offsets shall be cancelled out. Since $f_1$ varies upward in frequency from the offset value, no need arises for frequency clearance for $f_1$ to prevent it from reaching zero. Hence, an offset that is sufficient for $f_2$ is likewise sufficient for $f_1$. Accordingly, 1232 kilocycles is the frequency offset to be assigned to the source of frequency $f_1$, and $f_1$ varies from 1232 kilocycles up to any desired upper limit. In the illustrative embodiment, the variation due to $N_1$ is 20,000 kilocycles; that due to $N_3$ is 90 kilocycles; and that due to $N_5$ is one kilocycle; making a total of 20,091 kilocycles, reaching an upper limit of 21,323 kilocycles.

Use of heterodyne sources for $f_1$ and $f_2$ enables the variation ranges of the variable oscillators to be raised to any desired portion of the available frequency spectrum as hereinbefore noted. In the illustrative embodiment, $F_1$ ranges downward from an arbitrary frequency $K_0$ herein set at 90,000 kilocycles as an illustrative value. $F_1$ ranges from 90,000 kilocycles down to 69,909 kilocycles and $F_2$ ranges from 90,000 kilocycles up to 90,909 kilocycles. That is, $$F_1=K_0-N_1-N_3-N_5 \qquad (21)$$
$$F_2=K_0+N_2+N_4$$

Oscillator No. 0, which serves as beating oscillator common to Oscillators No. 1 and No. 2, may be assigned a frequency $F_0$ which is either higher than the highest other frequency in the system or lower than the lowest, as desired. In the first case, which is illustrated in Fig. 12, $$F_0=F_1+f_1=F_2+f_2 \qquad (22)$$

We have seen that in order to come out with a final output frequency that is free from all offsets, $F_1$ and $F_2$ must be applied on opposite sides of some arbitrary frequency which has been designated $K_0$. Substituting values of $f_1$ and $f_2$ from Expression 7 and values of $F_1$ and $F_2$ from Expression 21 into Expression 22 gives $$F_0=K_0+K_2+K_3+K_4+K_5 \qquad (23)$$

In the illustrative embodiment, $F_0$ is 91,232 kilocycles.

Alternating the decades as between the respective upper and lower trains of the system of Fig. 1, has the added advantage that it assures that the frequency increments introduced by the automatic frequency controls are always less than 0.1F, that is, one-tenth the frequency interval between harmonics in the unit in question. This is a feature which is important in removing ambiguity in the synthesis of the desired final output frequency. By virtue of this arrangement, the frequency of any component oscillator never departs far enough from the value required to beat with the proper harmonic to cause any possibility that a beat with another harmonic will lie within the filter pass band. For example, if $N_1$ is 19,000,000 cycles, and $N_3$ has its maximum value of 90,000 cycles, and $N_5$ its maximum value of one kilocycle, the sum $N_1+N_3+N_5$ will not exceed 19,091,000 cycles, which differs from 19,000,000 cycles by less than 10 percent of the 1000 kilocycle interval between harmonics in unit 11. The 10 percent increment will not be sufficient to move the desired beat frequency out of the pass band of Filter No. 1, or to move an undesired beat frequency into the pass band.

Similarly, for any value of $N_2$, the maximum value of $N_4$ is nine kilocycles, which is less than 10 percent of the 100 kilocycle interval between harmonics in unit 12.

Also, for any value of $N_3$, the maximum value of $N_5$ is one kilocycle, which is still only 10 percent of the 10 kilocycle interval between harmonics in unit 13.

If the oscillators are accurately calibrated and precisely set, the filter bands may be restricted to cover only barely the range of variation expected of the frequencies to be impressed. For example, Filter No. 1 in the illustrative embodiment requires a minimum pass band extending from 232 kilocycles to 323 kilocycles; Filter No. 2, from 23 kilocycles to 32 kilocycles; and Filter No. 3 from two kilocycles to three kilocycles. Any inaccuracy of calibration or any lack of precision in setting may cause the desired frequency components to lie outside limits of the minimum pass band, requiring that the pass band be widened. The wider the pass band, the greater the tolerance in the calibration and setting of the oscillators. As noted hereinabove, a limit on extension of the bandwidth is imposed by the consideration of excluding a beat frequency involving a harmonic of wrong ordinal number. The illustrative band limits of 0.1F and 0.4F permit about the maximum safe tolerance without danger of introducing ambiguity. Accordingly, it is necessary only that the oscillator settings be accurate within about ±0.1F. For example, dial setting $N_1$ should be accurate within ±100 kilocycles. Each automatic frequency control should, of course, be arranged so that it is capable of catching, synchronizing and holding any frequency component that lies within the filter pass band, considerations which are well known to those skilled in the art of frequency locking.

A frequency allocation wherein $F_0$ is lower than any other frequency in the system may readily be worked out using the principles hereinbefore discussed.

Any of the control paths 210, 220, 230, 240, may be opened, as by means of the switches 211, 221, 231, 241, respectively, thereby enabling the oscillator ordinarily controlled by the respective control path to be swept continuously over its frequency range instead of being locked to discrete steps. In this way, any desired portion of the available frequency spectrum may be scanned for purposes of exploration, as for example to discover a frequency of special interest.

It is to be understood that the above described arrangements are illustrative of the principles of the invention and are not to be taken as limiting.

What is claimed is:

1. A decimal system of frequency synthesis comprising first generating means providing an array of frequency components uniformly spaced in frequency, second generating means providing an array of frequency components uniformly spaced in frequency at intervals each one-tenth the frequency interval provided by said first generating means, third generating means providing an array of frequency components uniformly spaced in frequency at intervals each one-hundredth the frequency interval provided by said first generating means, a first auxiliary oscillator, automatic frequency control means connected to and actuated jointly by said first and third generating means to control the frequency of the auxiliary oscillator, a second auxiliary oscillator, automatic frequency control means connected to and actuated by said second generating means to control the frequency of said second auxiliary oscillator, and mixing means connected to both said auxiliary oscillators to derive therefrom an output wave controlled as to frequency by all three said generating means.

2. A frequency synthesizing system comprising first generating means providing an array of frequency components at equal frequency intervals, second generating means providing an array of frequency components spaced at equal frequency intervals that are a fraction of said first frequency intervals, continuously variable generating means covering a range of frequencies equal in number to the frequency differential of said second interval, a first auxiliary oscillator, automatic frequency control means connected to and actuated jointly by said first generating means and by said continuously variable generating means to control the frequency of the auxiliary oscillator, a second auxiliary oscillator, automatic frequency control means connected to and actuated by said second generating means to control the frequency of said second auxiliary oscillator, and mixing means connected to both said auxiliary oscillators to derive therefrom an output wave controlled as to frequency over a continuous frequency range determined by all three said generating means.

3. A wave synthesizer comprising a plurality of reference sources the respective frequencies of which form a series of integral powers of a given base frequency differing by one power from one member of the series to the next, a plurality of oscillatory stages associated in two groups, the typical stage in one group being connected to one of said reference sources and to the output of another stage in the same group wherein the connected reference source frequency is two powers smaller, the typical stage in the other group being connected to a reference source the frequency of which is one power different from one of the typical stages in the first mentioned group and to the output of another stage in the same group wherein the connected reference source frequency is two powers smaller, automatic frequency control means individual to each typical stage in each group whereby the output frequency of the stage depends upon the output frequency of another stage in the same group and upon the frequency of a respective one of the reference sources, first and second additional oscillatory stages, the typical stage of lowest said power in each group being connected to a respective one of said additional oscillatory stages in lieu of another typical stage, and mixing means combining output waves from a stage in one group and a stage in the other group for which stages the said respective powers differ by one.

4. A wave synthesizer comprising a plurality of control stages including at least first, second, and third control stages each comprising two wave sources, said control stages also comprising at least first, second, and third mixers respectively, each combining waves from the two wave sources in the respective stage, said control stages also comprising at least first, second, and third automatic frequency control means respectively, each controlling the frequency of one of the wave sources in the respective stage, a like plurality of phase detectors including at least first, second, and third phase detectors each responsive to a change in the phase relationship between two waves impressed thereon, first and second additional wave sources, means impressing upon the first phase detector a wave from the first mixer and a wave from the first additional wave source, means impressing upon the second phase detector a wave from the second mixer and a wave from the second additional wave source, means impressing upon each $n$th phase detector, where $n$ is at least three, a wave from the $n$th mixer and a wave from the frequency controlled wave source of the $(n-2)$nd control stage, the output of the $n$th phase detector being connected to the $n$th frequency control means for each stage, the phase detectors thereby serving to connect the said additional wave sources and control stages into two trains, each train beginning with one of the said additional wave sources, and ending with a final control stage which includes a frequency controlled wave source, an additional mixer common to both trains, and means connecting the output of the respective frequency controlled wave source in the final control stage of each train to the input of said additional mixer.

References Cited in the file of this patent

UNITED STATES PATENTS

| | | |
|---|---|---|
| 2,550,519 | Battaille | Apr. 24, 1951 |
| 2,580,254 | Summerhayes et al. | Dec. 25, 1951 |
| 2,582,768 | Colas | Jan. 15, 1952 |
| 2,666,141 | Clapp et al. | Jan. 12, 1954 |